United States Patent [19]

Gielly

[11] 4,075,305
[45] Feb. 21, 1978

[54] CONTINUOUS PROCESS FOR THE MANUFACTURE OF PHOSPHORIC ACID USING PROCESS WATER

[75] Inventor: Jean-Francois Gielly, Rouen, France

[73] Assignee: Rhone-Poulenc Industries, Paris, France

[21] Appl. No.: 738,141

[22] Filed: Nov. 2, 1976

[30] Foreign Application Priority Data

Nov. 4, 1975 France .................................. 75 33657

[51] Int. Cl.² ............................................. C01B 25/16
[52] U.S. Cl. ..................................................... 423/320
[58] Field of Search ............... 423/167, 316, 317, 320, 423/341

[56] References Cited

U.S. PATENT DOCUMENTS

| 3,498,746 | 3/1970 | Smaltz et al. | 423/320 |
|---|---|---|---|
| 3,498,747 | 3/1970 | Smaltz et al. | 423/320 |
| 3,699,212 | 10/1972 | Palm | 423/319 |
| 3,720,757 | 3/1973 | Hartig | 423/341 |
| 3,793,436 | 2/1974 | Hartig | 423/341 |
| 3,795,728 | 3/1974 | Scheel | 423/341 |
| 3,859,423 | 1/1975 | Hartig | 423/320 |

OTHER PUBLICATIONS

Slack-Phosphoric Acid-pp. 752 to 760 - 1968.
Atmospheric Emission from WDA Manufacture - 1970 - H.E.W. - pp. 14 & 15.

Primary Examiner—Earl C. Thomas
Assistant Examiner—Eugene T. Wheelock
Attorney, Agent, or Firm—Bacon & Thomas

[57] ABSTRACT

A continuous procedure is disclosed for the wet-process manufacture of phosphoric acid in a reaction zone and continuously cooled by means of evaporation into air circulating at the surface of the reaction zone. The evaporated gases are scrubbed by using part of the water needed for the methodic washing of the calcium sulfate, whereby the solution obtained is collected and passed into the reaction zone in such a way as to cause the soluble gaseous products to return to the reaction medium, from which they are collected with strong acid, which constitutes production. The procedure gives rise to no liquid pollutants, particularly fluorine, and does not increase the amount of water consumed.

10 Claims, 4 Drawing Figures

CONTINUOUS PROCESS FOR THE MANUFACTURE OF PHOSPHORIC ACID USING PROCESS WATER

BACKGROUND OF THE INVENTION

1. Field of the Invention

This invention relates to the wet-process manufacture of phosphoric acid from phosphate ores and more particularly to the continuous wet-process manufacture of phosphoric acid in a reaction zone from a phosphate ore such as fluorapatite.

2. Description of the Prior Art

The conventional continuous procedures for the manufacture of phosphoric acid widely used today employ principally a reaction zone and a filtration zone. The reaction zone is composed of one or several reactors into which the raw materials are introduced. The raw materials often comprise one or more of phosphate ore, sulfuric acid, and recycled liquids coming from the washing of the solid residue formed in the continuous production of phosphoric acid. The reaction zone is furnished with a cooling system of more or less importance according to the type of reaction. For example, the differences observed in a reaction in hemihydrate, anhydrite or gypsum are demonstrated by the fact that these reactions take place at different temperatures and accordingly, produce variable amounts of heat energy, which must be eliminated. Cooling is most often performed by evaporation in the conventional processes. One specific type of cooling system places the reaction zone in a partial vacuum, another type utilizes the treatment in partial vacuum of a limited flow of the reaction medium.

Air cooling provides yet another cooling method while eliminating the vacuum apparatus. Several of the different modes of cooling have been described notably in "PHOSPHORIC ACID" by A. V. Slack, 1968 edition, pp. 227-31, and reference is made thereto for a more detailed description of the prior art.

In the case of air cooling, air is circulated at and over the surface of the reaction zone so that it becomes laden with moisture and carries off the excess heat energy. Various gaseous products may also be given off into the circulating air. This system, of which the present invention constitutes an improvement, necessarily includes an apparatus designed for scrubbing the air containing the evaporated moisture and products before it is discharged into the atmosphere. The scrubbing operation permits the elimination of fluorous compounds derived from the phosphate ore undergoing reaction, principally hydrofluoric acid HF, and silicon tetrafluoride $SiF_4$. These compounds are released in varying proportions, along with water vapor and the carbon dioxide during the leaching reaction on the phosphate ore.

In addition to the reaction zone with its cooling system, the conventional apparatus commonly employs a filtration zone, one or several filters are often provided in the filtration zone and enable the operation of methodic washing methods. A methodic washing with a filter divided into sectors is accomplished in the following manner: after having collected the strong acid which constitutes production, the calcium sulfate is washed to one side by water, picking up minor quantities of phosphoric acid and becoming a very weak acid; the very weak acid is recycled and so on, until medium-strength acid is achieved and then returned to the reaction zone.

In order to produce concentrated phosphoric acid, the water necessary for the complete reaction-filtration system is carefully measured and distributed in order to fulfill the different water requirements, especially the requirement of water needed for wetting of the ore, dilution of the sulfuric acid, methodic washing of the calcium sulfate, as well as scrubbing of the cooling air. The water is commonly called "process-water". Now, frequently the washing of the air increases the amount of water consumed and leads to large amounts of water representing unusable effluents which must sometimes be neutralized before disposal.

SUMMARY OF THE INVENTION

Accordingly, it is an object of the present invention to establish a continuous procedure for manufacture of phosphoric acid which reduces or eliminates any polluting liquid discharges and which avoids increased water consumption.

The process for manufacture of phosphoric acid of the present invention comprises continuously:

introducing phosphate ore and sulfuric acid into a reaction zone containing diluted phosphoric acid;

reacting the contents of the reaction zone in circulating air environment;

removing the phosphoric acid produced from the reaction zone together with;

the calcium sulphate slurry from the reaction zone to a filtering zone;

removing gases evaporated into the circulating cooling air from the reaction zone;

scrubbing the cooling air containing evaporated gases in a scrubbing zone with process water to remove the recoverable gases from the cooling air into a solution and thereby purifying the circulating air;

recovering the solution and introducing at least part of the solution into the filtering zone;

introducing said part of the washing the solution into the filtering zone for methodic washing techniques with process water;

separating phosphoric acid from the calcium sulfate containing slurry in the filtering zone, and introducing the process water from the filtering zone into the reaction zone.

As is readily apparent from the above, water is employed in various stages of the above-described process; for example, the wetting of ore, dilution of the sulfuric acid, and washing steps. The water used in these steps may therefore, be freshly introduced water or the process water as commonly referred to in the prior art, or a combination of both, and preferably consists of only the process water.

DESCRIPTION OF THE PREFERRED EMBODIMENTS

A particular advantage of the present invention is that generally, a quantity of the process-water not greater than 25% is chosen for scrubbing the gases.

According to a preferred embodiment, the gas scrubbing solution is recovered and sent to the reaction zone by way of a passage through the filtration zone as at least a part of the process-water. This yields the advantage of performing a methodic washing of the filter with the help of a hot liquid. In fact, during the scrubbing, the gaseous compounds of the liquid and the gases tend to reach a state of thermal equilibrium. In this case, the discharge of liquid from the process-water used for scrubbing the gases is no greater than the amount that would have been used for the methodic washing of the calcium sulfate. It is generally preferred to use at the most about 80% of the process-water and divert it to serve as gas-scrubbing liquid. The scrubbing solution is recovered, sent over the filtration zone for the washing of calcium sulfate, and the remaining water discharge is used for supplementary washing of the calcium sulfate.

There is further the possible advantage of recovering the scrubbing solution and sending it over the filtration zone as before, but instead of sending it directly to the calcium sulfate washing, using it first on part of the filtration zone which has been cleared of calcium sulfate in order to wash the filtering surface first. The solution resulting from this first passage is then recycled over the calcium sulfate as previously described.

The scrubbing of gases is most advantageously accomplished by the use of an apparatus known for this purpose and capable of bringing about gas-liquid contact; an apparatus using a counter-flow of atomized liquid is the preferred choice. The scrubbing of the gases is preferably done by counter-flow in a device capable of continuously recycling the scrubbing liquid in order to obtain good absorption in a relatively small volume of liquid. One such washing operation is more fully disclosed in copending U.S. application Ser. No. 738,848 corresponding to French Application No. 75.33659.

For the scrubbing of gases, good advantage may be taken by utilizing a scrubbing system comprising several washers, preferably of the type capable of recycling liquids. In such a preferred arrangement, one has the possibility of making the series of scrubbers function in counter-flow by circulating the gas to be purified from one scrubber to another, counter-current to the scrubbing solution The solutions produced by each scrubber can also be collected separately. Accordingly, the solutions produced by different scrubbers have different properties, and it is sometimes advantageous to send one of the scrubbing solutions directly toward the reaction zone, following the general mode of operation of the invention, and to send another scrubbing solution, by way of a passage over the filtration zone, following the preferential mode of operation of the invention.

The reaction zone may advantageously comprise one or several reactors, of any known type, supplied with an air-circulation cooling system. The filtration zone may advantageously comprise one or several filters of a known variety; preferably, a vacuum filter is chosen having a horizontal revolving table which has means for the methodic scrubbing of gases and which provides good filtrate separation.

DESCRIPTION OF THE DRAWINGS

FIG. 1 represents schematically the general means of effecting the process of the invention. The reaction zone is represented in A, the filtration zone in B and the gaseous compound scrubbing zone in C. The cooling system for the reaction zone has not been represented for reasons of clarity of the diagram.

Figure 1:
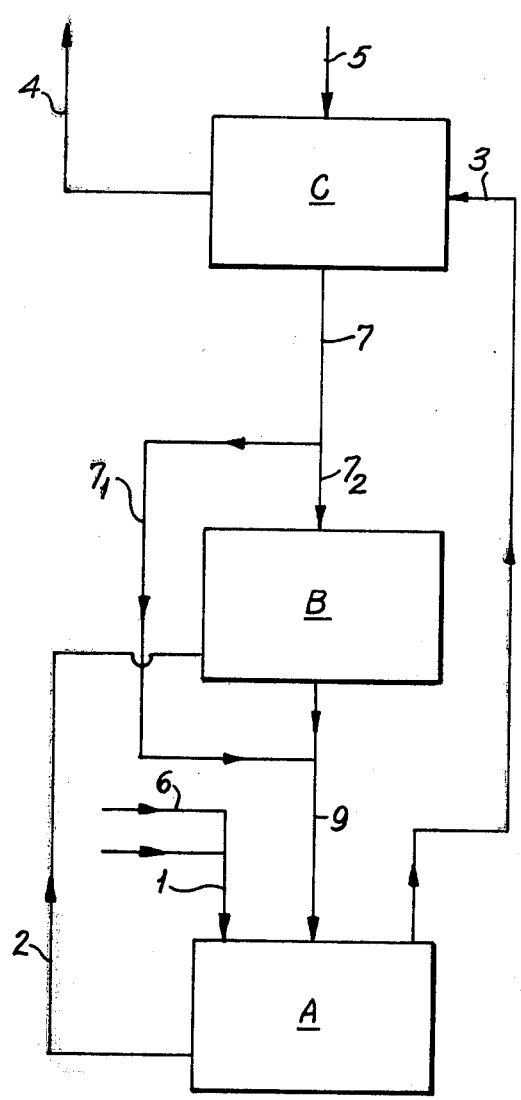
FIG. 1 represents a schematic flow chart for the general procedure of the present invention.

The arrival of the aggregate of raw materials is represented in FIG. 1 by the flow path 1. In 2, the evacuation of the reacted slurry is represented and shown as directed toward the filtration zone in a known manner by a circuit not represented in the diagram. The gaseous compounds which are directed toward the scrubbing zone as represented in 3. In 4, the evacuation toward the atmosphere of the purified gaseous compounds is represented. The entry of the washing liquid is shown by flow line 5. The schematic representation of the supply of sulfuric acid to the raw materials is provided by the flow path 6.

Flow path 7 demonstrates the scrubbing solution leaving the scrubbing zone, and flowing toward filtration zone B. The scrubbing solution can be delivered directly by $7_1$ to reaction zone A, where it joins flow path 9, or it can be directed toward reaction zone A by way of its passage in flow path $7_2$ over the filtration zone B.

By way of operation of the invention, as demonstrated in FIG. 1, the raw phosphate containing ore is introduced into the reaction zone A along with sulfuric acid through flow paths 1 and 6. The reaction is carried out in A with the continuous operation of cooling system (not shown) of circulating air at the reaction zone to effect the evaporation of gases into the circulating air. The evaporated gases are then carried away from the reaction zone by way of the continuously circulating air into flow path 3 and over into the scrubbing zone C. In the scrubbing zone, a scrubbing of the gases takes place with the scrubbing solution being introduced into the zone by flow path 5. After scrubbing of the gases, the purified gases may be exhausted into the atmosphere (as shown by 4) without emission of any harmful pollutants such as those carried off from the reaction zone. The scrubbing solution containing the recoverable dissolved fluorine compounds is then transferred to a filtration zone B or directly back to the reaction zone A via flow paths 7, $7_1$ or $7_2$ and 9, thereby completing the recycle of the recovered fluorine from the circulating gases. In the filtration zone B, the solution of recovered fluorine compounds take part of the methodic washing techniques and filtering of the calcium sulfate introduced from the reaction slurry via flow path 2 and according to the conventional procedure for removal of a reaction slurry from a reaction zone into a filtering zone. The further filtered process water is thereafter recycled back into reaction zone A by way of flow path 9 to complete the cycle. Thus, the strong phosphoric acid is continuously given off from the calcium sulfate containing slurry in the filtration zone while at the same time, fluorous compounds are removed from the gaseous product of the reaction zone and calcium sulfate is recovered from the reaction zone and methodically washed to purify it from any phosphoric acid.

Figure 2:
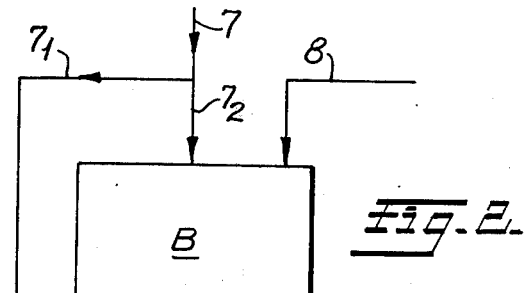
FIG. 2 represents a schematic flow chart of a particular preferred embodiment for the diverting and recycling of process water in the present invention.

FIG. 2 is a schematic representation of an alternative embodiment of the invention according to which only a fraction of the process-water is diverted for use as scrubbing liquid for the gaseous compounds. Flow line 8 represents the introduction of the remaining fraction of the water into filtration zone B which is utilized in the final washing of the calcium sulfate on the filter.

Figure 3:
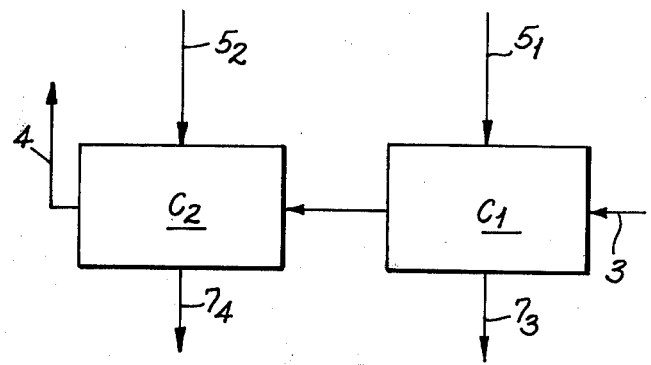
FIG. 3 is a schematic representation of a preferred embodiment of the present invention demonstrating a multi-staged scrubbing zone.

In FIG. 3 is represented the performance of the scrubbing zone C using two scrubbers, $C_1$ and $C_2$. This alternative embodiment enables the scrubber solutions to be collected separately via $7_3$ and $7_4$. It is also noted that the separate scrubbing zones $C_1$ and $C_2$ may be separately supplied with washing liquids $5_1$ and $5_2$.

In another embodiment of the invention, it has been found to be advantageous to complete the distribution of the process-water by a supplementary modification of the distribution of raw materials.

According to this modification, a portion of the flow of sulfuric acid introduced into the reaction zone is separated and added to the process-water in this embodiment of the invention.

Generally, one removes a part of the sulfuric acid of such quantity that the solution obtained by its addition to the process-water has a concentration of less than 10%.

Most often, it is preferred that the removed portion be regulated so that the solution obtained by its addition to the process-water results in a concentration of between 0.005% and 0.5%.

The sulfuric acid solution thus obtained is sent to feed the gas-scrubbing arrangements as above, then, depending on which particular filtration zone arrangement is utilized, is delivered either directly to the reaction zone, or toward the reaction zone by way of the filtration zone. In either case, the sulfuric acid is entirely used in the reaction zone.

Figure 4:
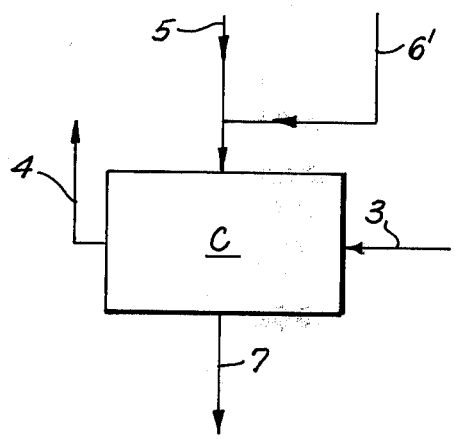
FIG. 4 represents a schematic flow chart of a preferred embodiment of the present invention demonstrating the addition of aqueous acidic solution to the scrubbing zone.

FIG. 4 gives a representation of this modification in a schematic of the above modification of the invention. In 6' seen the supply of sulfuric acid to the washing zone, diverted by means not pictured from the arrival point of sulfuric acid represented in 6, FIG. 1. Flow path 5 again represents the process-water introduced into the gaseous compound scrubbing zone. The exit point for the purified gaseous compounds from the cycle is also again represented by flow path 4.

This modification of the invention presents the advantage of supplying the scrubbers with an acidic water. Thus, the risks of incrustation, generally caused by calcium ions in the water, are eliminated. Correspondingly, the efficiency of the scrubbing installation is consequently improved and the requirements for mechanical or chemical cleanings are greatly reduced, if not eliminated. Furthermore, because the buildup of calcium deposits is avoided, it is possible and highly advantageous to employ atomization type scrubbing devices of the conventional type, particularly those with atomizers which have small orifices. In this manner, the wet-process manufacture of phosphoric acid may be continuously carried out in a highly efficient, low cost manner employing the most preferred arrangement of washing devices heretofore unavailable in the continuous operation.

The process of manufacture of phosphoric acid according to the invention in all its variants has the result of eliminating any need to increase the water necessary for the entire process and furthermore, eliminates the discharging of any liquid effluent. It further presents the following advantages: All the fluorous compounds given off by the reaction zone are captured and gathered up in the concentrated acid. This enables the extraction of the fluorine in a concentrated and utilizable form with a higher purity level than heretofore achievable with known processes. In fact, the scrubber recovers the dusts and entrained droplets carried off from the reaction. The process of the invention also permits the recovery of the heat energy formerly lost in the effluents, a source of pollution. It is in this way that the washing of the calcium sulfate by industrial water — at 10° C for example, which it would be necessary to heat to 56° C — would require, for an output of 50 $M^3$ per hour, an expenditure of heat energy equivalent to 5 metric tons per hour of steam. In the process of the invention, the hot dilute solutions are used to advantage in the different washing processes of the filtration zone, which are therefore more effective than the known processes.

EXAMPLE

The mixture of gases evacuated above a wet-process phosphoric acid reactor is treated. This mixture of gases is first treated by a series of three scrubbing processes in scrubbers supplied by water diverted from a total flow of process-water of 135 m³ per hour. For the scrubbing of the gases, a flow of 50 m³ per hour is diverted, and a scrubbing solution at 56° C is collected, which contains 4.5 g/l of fluorine, 2.4 g/l of sulphuric acid and which is then passed to the filtration zone.

The gas given off still contains a little fluorine and it is treated in a scrubber sprayed with a continuously recycled solution of soda, from which is extracted a flow of 2 m³ per hour of a solution at 55° C which contains 1.65 g/l of fluorine and 2.5 g/l of sodium, which is transferred to the reactor. The operation of the reactor proceeds without modification.

What is claimed is:

1. A process for the manufacture of phosphoric acid comprising the steps of continuously:
   introducing phosphate ore and sulfuric acid into a reaction zone;
   reacting the contents of said reaction zone in a circulating cooling air environment which results in the cooling air becoming heated;
   removing calcium sulfate slurry containing phosphoric acid produced by the reaction in said reaction zone to a filtering zone;
   separating said phosphoric acid from said calcium sulfate containing slurry in said filtering zone;
   removing gases produced by the reaction and evaporated into said heated circulating cooling air in said reaction zone;
   scrubbing said heated cooling air containing said evaporated gases in a scrubbing zone with process water to remove the recoverable gases from said cooling air into a solution and thereby purifying said air so that said process water is heated;
   recovering said heated solution and introducing at least part of said heated solution into said filtering zone and the remainder of said solution into said reaction zone;
   washing said calcium sulfate in said filtering zone with said heated solution introduced to said filtering zone by methodic washing techniques; and
   introducing said solution from said filtering zone into said reaction zone.

2. The process according to claim 1, wherein a quantity of process-water equal to at most 25% of the total process-water is utilized for said gas scrubbing step.

3. The process according to claim 1, wherein the process-water in said scrubbing step constitutes an amount at most equal to that quantity used for the methodic washing of said calcium sulfate.

4. The process according to claim 1, wherein the flow of gas scrubbing liquid is an amount equal to at most 80% of the flow of water used in washing the calcium sulfate, and after scrubbing is passed to the filtration zone for the washing of the calcium sulfate, and the remaining flow is used for a supplementary washing of the calcium sulfate.

5. The process of claim 1, wherein the gas scrubbing solution is recovered, sent to a filtering zone substantially cleared of sulfate, in such a way as to first wash the filtering surface and then wash the calcium sulfate.

6. The process according to claim 1, wherein the gas scrubbing is effected by a counter-flow scrubber employing liquid atomization.

7. The process according to claim 1, wherein the gas scrubbing is effected by a series of scrubbers from which the scrubbing solutions are separately collected.

8. The process according to claim 1, wherein a portion of said sulfuric acid introduced into the reaction zone is diverted and added to the flow of said process-water into said scrubbing zone for the gases evaporated by the reaction zone.

9. The process according to claim 8, wherein the portion of the sulfuric acid diverted is controlled to give an aqueous solution obtained by its addition to process-water having a concentration of less than 10% $H_2SO_4$.

10. The process according to claim 9, wherein the portion of the sulfuric acid diverted is controlled to give an aqueous solution obtained by its addition to process-water having a concentration between 0.005% and 0.5% $H_2SO_4$.

* * * * *